Nov. 6, 1934.  F. A. ENGEL  1,979,680

PIPE CLAMP

Filed Feb. 3, 1934

INVENTOR
Frank A. Engel
BY
S. J. Cox
ATTORNEY

Patented Nov. 6, 1934

1,979,680

UNITED STATES PATENT OFFICE 1,979,680

PIPE CLAMP

Frank A. Engel, Roselle, N. J., assignor to Inner-Tite Clamp Corporation, Elizabeth, N. J., a corporation of New Jersey Application February 3, 1934, Serial No. 709,575

4 Claims. (Cl. 285—119)

The present improvements relate in general to pipe joints and more particularly to a clamp for such joints to insure an effective seal and to prevent leakage about the joint.

A primary object of the improvements, among others, is to provide a novel type of clamp which is easy to apply, and is durable and more dependable in use.

A further object is to provide a clamp having novel provisions for maintaining the packing elements in proper sealing position. A further object is to provide a clamp structure which will prevent "creeping" or "flowing" of the gasket.

A still further object is to provide means for maintaining pressure on different parts of the group of elements comprising the packing means. Further objects and advantages of the improvements will be apparent to those skilled in the art upon reference to the accompanying specification and drawing, in which—

Figure 1:
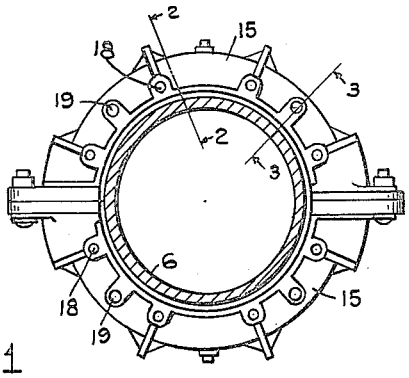
Figure 1 is an end elevation of the clamp illustrated in position about a bell and spigot joint.
Figure 2:
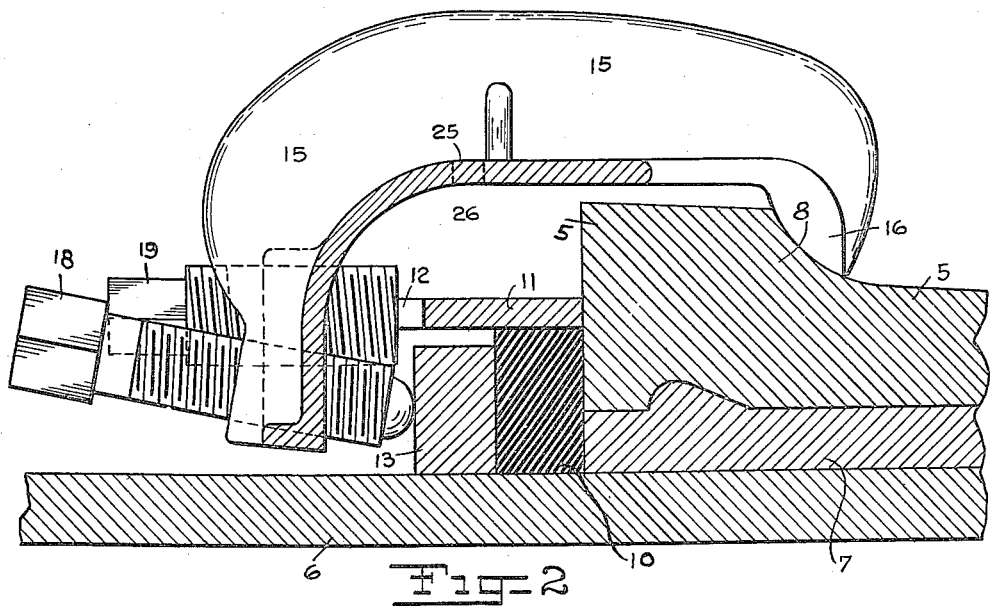
Figure 2 is an enlarged section taken on line 2—2 of Figure 1.
Figure 3:
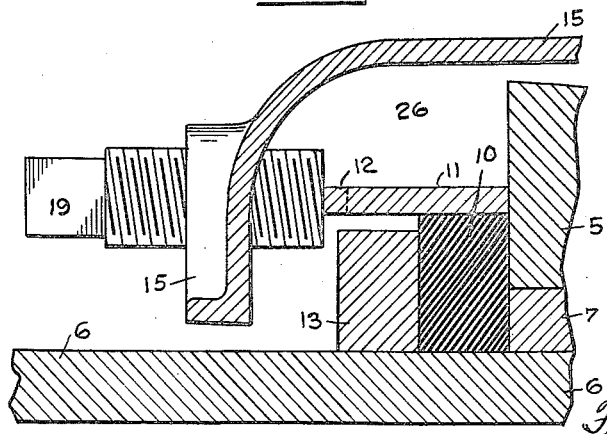
Figure 3 is an enlarged section taken on line 3—3 of Figure 1.

Referring to the drawing, the improvements are illustrated in connection with a bell and spigot type joint wherein the numeral 5 designates the bell end of a pipe section and 6 represents the spigot end of the adjacent pipe section fitting within the bell end and secured therein by a packing of calking yarn (not shown) and lead 7. Obviously, any suitable packing materials may be employed for sealing the bell and spigot joint at the time the pipe sections are laid, such materials being common and well known to those familiar in the art.

Although these pipe sections may be carefully laid and sealed at the time the line is constructed, nevertheless, climatic conditions, pressure and numerous other agencies may cause leaks to occur about these joints. Accordingly, after such leaks are detected, it is not feasible to take up the joint and relay the pipe sections with new sealing materials. It is common practice to add sealing elements and a clamp to the joint, thereby stopping the leak and restoring the joint to perfect condition. It is well understood that the application of these packing elements and clamps presents numerous difficulties due to the fact that the pipe line is in service and may be very inaccessible. For this and other reasons, much difficulty has been encountered in this particular field.

Referring again to the drawing, an annular gasket or packing ring 10 of one or more parts composed of rubber, leather or other suitable compressible material, is provided with a snug fit about the spigot section 6 and contacts the usual seal 7 as well as the end of the bell section. The gasket has a nice, snug fit with all these elements. Surrounding this gasket is a collar or annular keeper ring 11 which may be of one or more sections and has its inner rim engaging the end face of the bell section. The outermost rim of the collar 11 may be provided with a series of spaced bosses 12, which project a slight distance from the normal limits of the collar. These bosses are disposed at spaced intervals along collar 11, as hereinafter described. An annular compression ring or follower 13 is disposed within the collar 11 and as illustrated, is in contact with the gasket 10.

The foregoing elements may be referred to generally as packing elements, since they cooperate as a group to effect a seal and correct the leak.

Various means may be provided for insuring the proper position of these packing elements at all times and such provision may take the form of a removably anchored clamp either in one piece or in more pieces, or it may take the form of a clamp immovably anchored to the bell section. However, the particular clamp chosen for illustration by way of example, comprises a one piece annular housing 15, which extends from the shoulder 8 of the bell section over to the spigot section and thereby extends about the joint and the packing elements 10 to 13. This clamp is of the type illustrated in my copending applications Serial No. 570,386, filed October 22, 1931, (now Patent No. 1,964,044), and No. 607,920, filed April 28, 1932. The clamp ring member or housing 15 is provided with a bead 16 which engages the shoulder of the bell section and thereby anchors the clamp member in position. Obviously, the bead 16 may be replaced by a plurality of spaced lugs if desired. Numerous other details of the clamp member will be apparent upon reference to the aforementioned copending applications.

The free end of the clamp member 15 which projects toward the spigot section is provided with two series of retaining members for maintaining certain elements of the packing group in proper position. One series of retaining members is provided in the form of screws 18 which have threaded engagement with the clamp ring member 15 and are aligned with the follower ring 13. The other series of retaining members are screws 19 which also have threaded engagement with the clamp ring member 15 and are aligned with the collar or annular member 11. When the structure is assembled in position, the collar 11 and ring 15 are so arranged that the screws 19 and bosses 12, if bosses are used, are in alignment. When collar 11 is lower than the normal position of ring 13, screws 19 contact the collar directly and bosses 12 are dispensed with. The screws 18 and 19 are advanced into engagement with the follower 13 and collar 11, respectively, thereby exerting pressure on these elements and maintaining them in proper position against the adjacent pipe sections. The follower 13 engages and exerts a substantial pressure on the gasket 10 while the collar 11 is maintained by screws 19 under pressure against the end face of the bell section.

The ring member 15 may be provided with a port 25 through which a plastic or other suitable type of composition may be poured for filling the channel 26 as outlined in my copending applications.

It is noteworthy that when the screws 18 cause follower 13 to bring pressure to bear on the gasket 10, that the latter may tend to spread outwardly and lose its shape and effectiveness. The collar 11 has therefore been provided for confining the gasket within the proper limits and for forming a guard or fence beyond which the gasket is prevented from expanding. Under stress of continued pressure as well as movement between the pipe sections over a prolonged interval and due to climatic or other conditions, the gasket may have a tendency to "creep" or "flow" along the end face of the bell and nose its way between such face and the inner edge of the collar 11. As a result of this, the gasket naturally becomes loose and the seal is impaired and the general effectiveness of the elements is jeopardized. However, with the present improvements, the screws 19 maintain the collar 11 in such a close and intimate relation with the end face of the bell that there is no opportunity for the gasket 10 to "flow" or "creep" in the manner aforementioned and therefore the effectiveness of the seal is maintained. Any attempt of the gasket to thrust itself outwardly is resisted by the collar 11, which is anchored by the screws against bell section.

While the retaining means 18 and 19 have been illustrated in the form of adjustable screws, it is apparent that they may take other forms, such as eccentrically mounted cams or the like. Furthermore, it is obvious that bosses might be provided on the clamp ring 15 in place of the screws and some reliable adjusting means for tightening the clamp in position could be provided at the opposite end of the clamp ring member for cooperation with the bell section. As previously noted, collar 11 may also be of sufficient width to eliminate the necessity of bosses 12. Various other modifications may be apparent to those skilled in the art and may be adopted without departing from the scope and purview of the present improvements.

I claim:

1. A clamp for a pipe joint of the bell and spigot type comprising an annular gasket surrounding the spigot section, an annular follower behind said gasket, an annular collar surrounding said follower and gasket, a clamp member attached to said bell section and extending about the gasket, collar and follower, and adjustable retaining members cooperating with said clamp member and movable toward the end face of the bell section for engaging said collar and follower, one of said retaining members engaging the annular edge of said collar for maintaining it against said face.

2. A clamp for a pipe joint of the bell and spigot type comprising an annular gasket surrounding the spigot section, an annular follower behind said gasket, an annular collar surrounding said follower and gasket, a clamp member attached to said bell section and extending about the gasket, collar and follower, a retaining member aligned with said follower and gasket and a second retaining member having a collar engaging portion positioned for engaging the edge of said collar, for holding it against movement away from the end face of the bell section.

3. A clamp for a pipe joint of the bell and spigot type comprising an annular gasket surrounding the spigot section, an annular follower behind said gasket, an annular collar surrounding said gasket, a clamp member attached to said bell section and extending about the gasket, collar and follower, a screw in said clamp member aligned with said follower and gasket and a second screw in said clamp member having a collar engaging end positioned for engaging the edge of said collar for holding its opposite edge against the end face of the bell section.

4. A clamp for a pipe joint of the bell and spigot type comprising an annular gasket surrounding the spigot section, an annular follower behind said gasket, an annular collar surrounding said collar and gasket, a clamp member attached to the bell section and surrounding said gasket, collar and follower, a screw in said clamp member engaging said follower, and a second screw extending in the same general direction as said first named screw, and engaging the rim of said collar, said second screw having an end-engaging-surface of greater cross section than the cross sectional engaging surface of said collar.

FRANK A. ENGEL.